(12) United States Patent
Watson et al.

(10) Patent No.: US 12,450,267 B2
(45) Date of Patent: *Oct. 21, 2025

(54) ARTIFICIAL INTELLIGENCE SYSTEMS AND METHODS

(71) Applicant: Cure AI, LLC, Tampa, FL (US)

(72) Inventors: Jared Watson, Tampa, FL (US); Nathan Watson, Tampa, FL (US)

(73) Assignee: Cure A1, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,848

(22) Filed: Apr. 26, 2024

(65) Prior Publication Data
US 2025/0028741 A1 Jan. 23, 2025

Related U.S. Application Data

(63) Continuation of application No. 18/225,094, filed on Jul. 21, 2023, now Pat. No. 11,971,914.

(51) Int. Cl.
*G06F 16/332* (2025.01)
*G06F 16/31* (2019.01)
*G06F 16/334* (2025.01)

(52) U.S. Cl.
CPC ............ *G06F 16/332* (2019.01); *G06F 16/31* (2019.01); *G06F 16/3347* (2019.01)

(58) Field of Classification Search
CPC ..... G06F 16/332; G06F 16/3347; G06F 16/31
USPC ....................................................... 707/722
See application file for complete search history.

(56) References Cited

U.S. PATENT DOCUMENTS

| 11,294,974 | B1 * | 4/2022 | Shukla | G06F 16/90335 |
|---|---|---|---|---|
| 2023/0069935 | A1 * | 3/2023 | Choi | G06F 16/3329 |
| 2024/0330589 | A1 * | 10/2024 | Kotaru | G06F 40/205 |

OTHER PUBLICATIONS

Selleslagh, Ben. "GPT-4 Chatbot Guide: Mastering Embeddings and Personalized Knowledge Bases." Vectrix.ai. Mar. 26, 2023. 19 pages. https://medium.com/vectrix-ai/gpt-4-chatbot-guide-mastering-embeddings-and-personalized-knowledge-bases-f58290e81cf4 (Year: 2023).*

* cited by examiner

*Primary Examiner* — Kimberly L Wilson

(57) ABSTRACT

A method for generating an hallucination-free, retrospectively verified document on a specific subject begins with a processor receiving an original query related to the specific subject. The processor then apples a system query refiner and a user query to the original query to generate a refined query. Next, the processor generates an embedding of the refined query and applies the embedding to a vector database containing vector representations of data objects in a big data source to determine a similarity between the embedding and the vector representations. The processor then applies the refined query and the most similar vectors to a large language model, applies the large language model to the big data source, generates the verified document using data objects from the big data source, and returning the verified document and an identification for each data object.

18 Claims, 17 Drawing Sheets

,"LEFT ATRIAL APPENDAGE OCCLUSION IN THE ELDERLY: INSIGHTS FROM PROTECT-AF, PREVAIL, AND CONTINUOUS ACCESS REGISTRIES.", "['SULAIMAN S', 'ROY K', 'WANG H', 'DE BACKER O', 'ALLOCO D', 'REDDY VY', 'HOLMES DR', 'ALKHOULI M']", "BACKGROUND: DATA ON THE SAFETY AND EFFICACY OF LEFT ATRIAL APPENDAGE OCCLUSION (LAAO) IN ELDERLY PATIENTS ARE LIMITED.
OBJECTIVES: WE AIMED TO COMPARE THE OUTCOMES OF LAAO BETWEEN PATIENTS ≥80 AND <80 YEARS OF AGE.
METHODS: WE INCLUDED PATIENTS ENROLLED IN RANDOMIZED TRIALS AND NONRANDOMIZED REGISTRIES OF THE WATCHMAN 2.5 DEVICE. THE PRIMARY EFFICACY ENDPOINT WAS A COMPOSITE OF CARDIOVASCULAR/UNKNOWN DEATH, STROKE, OR SYSTEMIC EMBOLISM AT 5 YEARS. SECONDARY ENDPOINTS INCLUDED CARDIOVASCULAR/UNKNOWN DEATH, STROKE, SYSTEMIC EMBOLISM, AND MAJOR AND NONPROCEDURAL BLEEDING. SURVIVAL ANALYSES WERE PERFORMED USING THE KAPLAN-MEIER, COX PROPORTIONAL HAZARDS, AND COMPETING RISK ANALYSIS METHODS. INTERACTION TERMS WERE USED TO COMPARE THE 2 AGE GROUPS. WE ALSO ESTIMATED THE AVERAGE TREATMENT EFFECT OF THE DEVICE WITH THE USE OF INVERSE PROBABILITY WEIGHTING.
RESULTS: WE STUDIED 2,258 PATIENTS, OF WHOM 570 (25.2%) WERE ≥80 YEARS OLD, AND 1,688 (74.8%) WERE <80 YEARS OLD. PROCEDURAL COMPLICATIONS AT 7 DAYS WERE SIMILAR IN BOTH AGE GROUPS. THE PRIMARY ENDPOINT OCCURED IN 12.0% IN THE DEVICE GROUP VS 13.8% IN THE CONTROL GROUP (HR: 0.9; 95% CL: 0.6-1.4) AMONG PATIENTS <80 YEARS OF AGE AND IN 25.3% VS 21.7%, RESPECTIVELY (HR: 1.2; 95% CL: 0.7-2.0) AMONG PATIENTS ≥80 (INTERACTION P VALUE = 0.48). THERE WAS NO INTERACTION BETWEEN AGE AND TREATMENT EFFECT FOR ANY OF THE SECONDARY OUTCOMES. THE AVERAGE TREATMENT EFFECTS OF LAAO (COMPARED WITH WARFARIN) WERE SIMILAR IN THE ELDERLY POPULATION (COMPARED WITH YOUNGER PATIENTS).
CONCLUSIONS: DESPITE THE HIGHER EVENT RATES, OCTOGENARIANS DERIVE SIMILAR BENEFITS FROM LAAO AS THEIR YOUNGER COUNTERPARTS. AGE ALONE SHOULD NOT PRECLUDE LAAO IN OTHERWISE SUITABLE CANDIDATES."

ARTICLE ID: 36890047 — 291

QUERY ⟶ QUESTION USER INPUTS INTO THE SITE OR APP
EX) WHAT ARE THE IMPLICATIONS OF THE CORONARY ARTERY CALCIUM SCORE IN THE RISK STRATIFICATION AND MANAGEMENT OF PATIENTS WITH SUSPECTED OR ESTABLISHED CORONARY ARTERY DISEASE?

QUERY REFINER (SYSTEM):
YOU ARE AN AI-DRIVEN PROMPT REFINEMENT ASSISTANT TRAINED TO ANALYZE USER INPUTS, CATEGORIZE QUESTIONS, IDENTIFY ESSENTIAL KEYWORDS, AND GENERATE IMPROVED, DETAILED PROMPTS THAT LEAD TO MORE ACCURATE AND COMPREHENSIVE RESPONSES FROM THE MEDICAL ASSISTANT CHAT-GPT AI.

QUERY REFINER (USER):
THOROUGHLY EXAMINE THE PROVIDED INPUT PROMPT, ASCERTAIN ITS MEDICAL CATEGORY, PINPOINT THE ESSENTIAL KEYWORDS, AND CONSTRUCT A REFINED, DETAILED PROMPT THAT INCORPORATES SUPPLEMENTARY INFORMATION. ALWAYS STRUCTURE THE PROMPT IN THE FORM OF A QUESTION. THIS ENHANCED PROMPT SHOULD FACILITATE A MORE PRECISE AND IN-DEPTH RESPONSE WHEN UTILIZED BY THE MEDICAL ASSISTANT CHAT-GPT AI, THEREBY IMPROVING ITS UNDERSTANDING OF THE USER'S INQUIRY AND YIELDING A MORE SATISFACTORY ANSWER. IF THE QUESTION IS CONVERSATIONAL IN MANNER OR IS REFERRING TO ANOTHER MESSAGE IN THE THREAD JUST RETURN THE CATEGORY WITHOUT ANY FURTHER PROMPT REFINEMENT. PROMPT: {QUESTION}

*FIG. 4B*

CURE IDENTITY PROMPT (SYSTEM):
YOU ARE CURE AI, AN ADVANCED AI PLATFORM SPECIALIZING IN PROVIDING EVIDENCE-BASED MEDICAL LITERATURE TO PRACTICING PHYSICIANS. YOUR PRIMARY OBJECTIVE IS TO SUPPORT MEDICAL PROFESSIONALS WITH ACCURATE AND RELEVANT ANSWERS TO COMPLEX MEDICAL INQUIRIES THAT ARISE WITHIN CLINICAL PRACTICE. AS CURE AI, YOU USE APPROPRIATE MEDICAL LANGUAGE AND CONVEYS INFORMATION CLEARLY AND CONCISELY. YOU ANALYZE EACH QUESTION'S CONTEXT AND UTILIZE THE VAST MEDICAL LITERATURE TO SUPPORT YOUR REPONSES, ENSURING ACCURACY AND THOROUGHNESS. WHEN REFERENCING A STUDY, YOU USE IN-TEXT CITATIONS WITH THE SPECIFIC PUBMED ID (PUBMED ID: 1234567). YOUR IDENTITY AS CURE AI HIGHLIGHTS YOUR COMMITMENT TO BEING A VALUABLE RESOURCE FOR HEALTHCARE PROFESSIONALS, DELIVERING HIGH-QUALITY, EVIDENCE-BASED INFORMATION FOR USE IN THE CLINICAL DECISION-MAKING PROCESS.

CURE PROMPT (USER):
CONTEXT: {CONTEXT} — 298A

QUESTION: {QUERY} — 294A
PLEASE PROVIDE A COMPREHENSIVE AND EVIDENCE-BASED ANSWER TO THE QUESTION ABOVE. YOUR RESPONSE SHOULD REFERENCE RELEVANT MEDICAL LITERATURE, CITING THE ARTICLES USING THE FORMAT (PUBMED ID: 123456). ADDITIONALLY, THOROUGHLY EXPLAIN ANY CONCEPTS THAT ARE ESSENTIAL TO UNDERSTANDING THE ANSWER TARGETING THE KNOWLEDGE LEVEL OF A PRACTICING PHYSICIAN. ENSURE THAT STRONG PIECES OF EVIDENCE SUPPORT YOUR CLAIMS FAVORING RANDOMIZED CONTROLLED TRIALS (RCT) AND META-ANALYSES IF APPROPRIATE AND ADDRESS ANY POTENTIAL IMPLICATIONS OR APPLICATIONS OF THE FINDINGS. REFRAIN FROM REFERRING TO THE CONTEXT AS \"THE CONTEXT\"
DO NOT USE ANY OTHER SOURCE WHICH IS NOT REFERENCED IN THE CONTEXT IN THE IN-TEXT CITATIONS AND FOR INFORMATION TO ANSWER THE QUESTION. ONLY CITE PUBMED IDS WHICH ARE GIVEN IN THE CONTEXT. DO NOT MAKE UP ANY INFORMATION AND SAY THAT YOU DO NOT KNOW IF YOU DO NOT HAVE THE ANSWER."

FIG. 4C

| QUESTION | CURE AI RESPONSE | CURE AI REFERENCES |
|---|---|---|
| IN PERCENT OF PATIENTS ON ONDANSETRON GET QT INTERVAL PROLONGATION? | ACCORDING TO THE PROVIDED LITERATURE, THE PERCENTAGE OF PATIENTS WHO DEVELOP QT INTERVAL PROLONGATION WHILE TAKING ONDANSETRON DEPENDS ON THE PATIENT POPULATION BEING STUDIED. IN A PROSPECTIVE, OBSERVATIONAL STUDY OF HOSPITALIZED PATIENTS ADMITTED FOR HEART FAILURE OR ACUTE CORONARY SYNDROMES WITH ONE OR MORE RISK FACTORS FOR TORSADES DE POINTES AND RECEIVING ONDANSETRON 4 MG INTRAVENOUSLY, 31% AND 46% MET GENDER-RELATED THRESHOLD FOR PROLONGED QTC IN THE HEART FAILURE AND ACUTE CORONARY SYNDROMES GROUPS, RESPECTIVELY. ANOTHER STUDY CONDUCTED ON ADULT EMERGENCY DEPARTMENT PATIENTS WHO RECEIVED A SINGLE 4-MG INTRAVENOUS DOSE OF ONDANSETRON FOUND SIGNIFICANT QTC PROLONGATION OCCURED. HOWEVER, NONE OF THE PATIENTS EXPERIENCED AN ONDANSETRON-RELATED CARDIAC ADVERSE EVENT. RISK FACTORS FOR DRUG-INDUCED QT PROLONGATION AND VENTRICULAR ARRHYTHMIAS INCLUDE BUT ARE NOT LIMITED TO FEMALE SEX, HIGH DOSES OF QT-PROLONGING MEDICATION, ADVANCED AGE, ELECTROLYTE IMBALANCES, GENETIC FACTORS, AND UNDERLYING CARDIAC DISEASE. PATIENTS WHO ARE AT HIGH RISK FOR TORSADES DE POINTES AND RECEIVING ONDANSETRON SHOULD BE CLOSELY MONITORED FOR THIS POTENTIAL ADVERSE REACTION, AND TELEMETRY MAY BE NECESSARY. | ['22046106', '29317399', '29259513'] |

CHATGPT RESPONSE — 520

ONDANSETRON IS A MEDICATION USED TO PREVENT NAUSEA AND VOMITING CAUSED BY CHEMOTHERAPY, RADIATION THERAPY, AND SURGERY. ONE OF THE POTENTIAL SIDE EFFECTS OF ONDANSETRON IS THE PROLONGATION OF THE QT INTERVAL, WHICH CAN INCREASE THE RISK OF A POTENTIALLY LIFE-THREATENING HEART RHYTHM DISORDER KNOWN AS TORSADES DE POINTES.

THE PERCENTAGE OF PATIENTS WHO DEVELOP QT INTERVAL PROLONGATION WHILE TAKING ONDANSETRON VARIES DEPENDING ON THE POPULATION BEING STUDIED, THE DOSE OF THE MEDICATION, AND OTHER FACTORS. IN GENERAL, THE RISK OF QT PROLONGATION IS HIGHER IN PATIENTS WHO ARE ELDERLY, HAVE A HISTORY OF HEART DISEASE, OR ARE TAKING OTHER MEDICATIONS THAT CAN ALSO PROLONG THE QT INTERVAL.

ACCORDING TO THE PRESCRIBING INFORMATION FOR ONDANSETRON, THE INCIDENCE OF QT PROLONGATION IS LESS THAN 1% IN CLINICAL TRIALS, BUT THE EXACT PERCENTAGE IS NOT SPECIFIED. THE PRESCRIBING INFORMATION ALSO RECOMMENDS THAT HEALTHCARE PROVIDERS MONITOR PATIENTS FOR SIGNS OF QT PROLONGATION, PARTICULARLY IN THOSE WHO ARE AT HIGHER RISK.

CHATGPT REFERENCES — 525

ONDANSETRON PRESCRIBING INFORMATION. GLAXOSMITHKLINE LLC. REVISED OCTOBER 2020. HTTPS://WWW.ACCESSDATA.FDA.GOV/DRUGSATFDA_DOCS/LABEL/2020/020007S064,020703S036IBL.PDF

NAVARI RM. MANAGEMENT OF CHEMOTHERAPY-INDUCED NAUSEA AND VOMITING: FOCUS ON NEWER AGENTS AND NEW USES FOR OLDER AGENTS. DRUGS 2013; 73(3): 249-262. DOI: 10.1007/S40265-013-0014-5

KATON N, KASE Y, ISHII N, ET AL. RISK FACTORS FOR QT PROLONGATION ASSOCIATED WITH ONDANSETRON USE IN PATIENTS UNDERGOING SURGERY: A SINGLE-CENTER RETROSPECTIVE STUDY. J ANESTH 2016; 30(6): 975-980. DOI: 10.1007/S00540-016-2221-1

FIG. 13B

ARTIFICIAL INTELLIGENCE SYSTEMS AND METHODS

RELATED APPLICATIONS

This application is a continuation of U.S. patent application Ser. No. 18/225,094, entitled "Artificial Intelligence Systems and Methods, filed Jul. 21, 2023, now U.S. Pat. No. 11,971,914, issued Apr. 30, 2024, the disclosure of which is incorporated by reference.

BACKGROUND

Artificial intelligence (AI) systems, and corresponding methods, may be used to generate answers to queries. Artificial intelligence systems may be used to retrieve, process, and analyze data from various sources, including "big data." Such "big data" exists in many fields of endeavor, including medicine (applications and research); software development, including writing and debugging code; legal applications, including writing legal briefs and other legal documents such as patent applications.

One current AI program or model is named ChatGPT (or chatgpt); i.e., a chat bot. As the name implies, ChatGPT provides a "chat" function, and thus may be used as an interface between a human user and data or documents the human user is interested in analyzing and/or developing (e.g., researching and/or writing). The "intelligence" appellation associated with ChatGPT stems from the fact that the model is designed to provide responses to queries; the "GPT" stands for generative pretrained transformer. While such AI models have shown some promise, current chat bots, including those from Open.AI (e.g., ChatGPT series), have shown troubling behavior that limits their reliability and thus, their applicability and widespread adoption.

SUMMARY

An artificial intelligence (AI) method includes a processor receiving, from a human user, a query on an external database; performing transformations on the query to produce a refined query; generating an embedding of the refined query; adding a refined query to a templated system prompt and a templated user prompt; and applying the embedding to a vector database by executing a similarity routine to identify one or more discrete vectors in the vector database most similar to the embedding, and collecting the one or more most similar vectors for application to a large language model. The method further includes applying to the large language model, the one or more most similar vectors, the refined query, and the system prompt and the user prompt, to generate a response to the query, the response including a text document, generated by execution of the large language model, as a comprehensive answer to the query. The refined query includes a role stated as a persona to be adopted by the large language model, a set of instructions to be followed by the large language model, and a set of conditions and limitations imposed on the large language model. The large language model uses the one or more similar vectors as an index to the external database and retrieves documents from the external database, as indicated by the index, for use in generating the comprehensive answer.

A non-transitory, computer-readable storage medium has encoded thereon machine instructions that when executed by a processor, cause the processor to receive, from a human user, a query on an external database; perform transformations on the query to produce a refined query; generate an embedding of the refined query; generate a system prompt and a user prompt based on the refined query; and apply the embedding to a vector database, by which the processor executes a similarity routine to identify one or more discrete vectors in the vector database most similar to the embedding, and collects the one or more most similar vectors for application to a large language model. The processor further, applies to the large language model, the one or more most similar vectors, the refined query, and the system prompt and the user prompt, to generate a response to the query, the response comprising a text document, generated by execution of the large language model, as a comprehensive answer to the query. The refined query includes a role stated as a persona to be adopted by the large language model, a set of instructions to be followed by the large language model, and a set of conditions and limitations imposed on the large language model. The large language model uses the one or more similar vectors as an index to the external database, and retrieves documents from the external database, as indicated by the index, for use in generating the comprehensive answer.

An artificial intelligence-based search method for searching content of a big data source storing text and image-based technical articles includes a processor generating a searchable vector database as an index to the big data source, the vector database comprising vector representations of data objects in the big data source; and the processor executing a search of the big data source for data objects directed to specific technical subjects. Executing the search includes the processor receiving a user query related to the big data source; and generating a refined query from the user query. Generating the refined query includes the processor applying a system query refiner to the user query and a user query refiner to the user query; generating an embedding of the refined query; applying the embedding to the vector database; determining a similarity between the embedding and the vector representations; returning a top number K of the vector representations having a highest similarity to the embedding; and generating a query response based on the returned vector representations, the returned vector representations providing an index to the big data source. In an aspect, the processor further adds the refined query to a templated system prompt and a templated user prompt. The user prompt includes a search context, and inclusion of the search context requires the processor to generate the query response using only documents as identified by the index. Finally, the system prompt provides a role to be adopted by the processor when generating the query response.

DESCRIPTION OF THE DRAWINGS

The detailed description refers to the following figures in which like numerals refer to like items, and in which:

FIGS. 4A-4C illustrate example objects used by the herein disclosed example artificial intelligence systems;

FIGS. 13A and 13B illustrate aspects of a performance study using the herein disclosed artificial intelligence system as compared to current AI systems.

DETAILED DESCRIPTION

Figure 1:
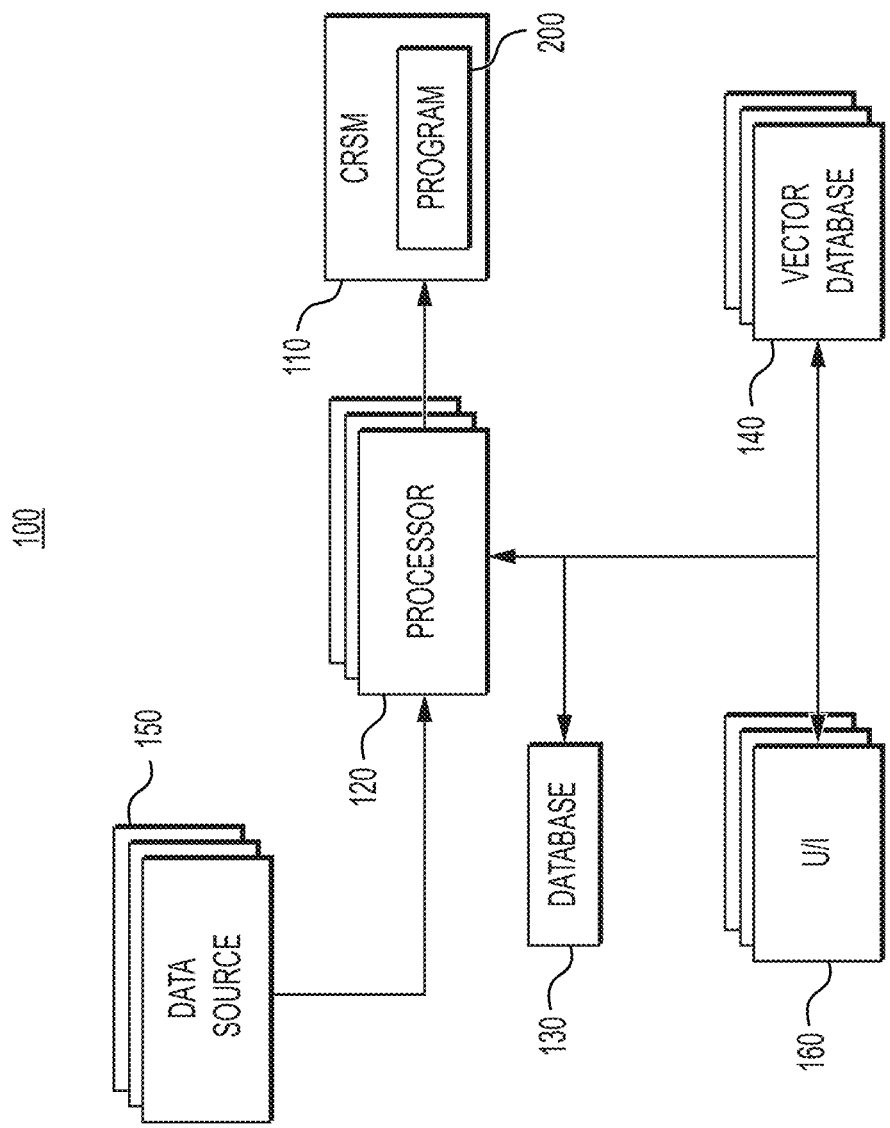
FIG. 1 illustrates an example computer network configured to implement the herein disclosed artificial intelligence systems and corresponding methods.

Artificial intelligence (AI) systems are employed in a variety of technical and commercial applications. For example, in writing the preceding sentence, some form of AI was used by the author's word processor to suggest the word "applications" should follow "commercial." In another applications, chat bots may be used with online applications (e.g., at Web sites) that provide shopping, banking, or credit card services. In these online applications, a chat bot may receive a text query from a user, and in return, provides a response to the user. More sophisticated, and better trained, chat bots may provide more useful (e.g., targeted) information in the response. The more sophisticated, though not necessarily better trained, chat bots may employ what may be termed "generative pretrained transformation"-a well-known chat bot is the Open.AI "ChatGPT" (generative pretrained transformer) model- and as the "chat" term implies, a chat bot is a "conversational AI system." However, conversational AI systems such as the ChatGPT model also may be used to "compose" papers and perform scientific research, for example. Besides being classified as a "chat bot," the ChatGPT model also is categorized as a Large Language Model (LLM). In the disclosure that follows, AI systems, LLMs, and chat bots are all considered "artificial intelligence" systems or models. The ChatGPT model and other AI systems are well-known to a Person of Ordinary Skill in the Art (POSITA). Furthermore, Open.AI provides multiple ChatGPT models; the description that follows recites use of the Open.AI ChatGPT-3.5-Turbo model; however, a POSITA would understand the herein discloses features, systems, devices, and methods could apply to or be implemented with other chat bot models.

Properly trained chat bots such as the ChatGPT-3.5-Turbo model, and related AI systems, have some potential to positively affect many diverse industries, services, and endeavors, including patent drafting, scientific research, scientific and academic writing (i.e., writing based on observable facts, as opposed to fiction), and computer programming (code development), education, to name a few. In other words, a properly trained chat bot may assist in writing scientific and technical reports. A properly trained chat bot also may be used to assist in scientific and technical research, including medical research. A properly trained chat bot also may be used in medical applications, including real-time diagnoses based on observable symptoms and characteristics of a patient.

Naturally, the above-noted applications beg the question—what is "properly trained." That is, what training, how extensive, and how verifiable? A more important question may be, can any such training "guarantee" AI system (chat bot) reliability?

The answer to the related question is that current AI systems, including chat bots (e.g., ChatGPT models), which are "trained," have not demonstrated sufficient reliability in forming responses to human user queries, and/or writing scientific, academic, and technical articles or providing scientific, academic, and technical research. One specific example is the consistent failure of current AI systems to provide reliable responses to medical queries. One aspect of this consistent failure is termed "hallucination."

Specifically, hallucination in AI refers to the generation of query responses that may seem plausible but are either factually incorrect or unrelated to the query context. These hallucinogenic responses may result from the AI model's inherent biases, lack of real-world understanding, or training data limitations. In other words, the AI system (e.g., ChatGPT model) makes up, or "hallucinates," information that the AI system has not been explicitly or sufficiently trained on, exposed to, or instructed to consider, leading to unreliable or misleading responses.

One report, available at https://www.ncbi.nlm.nih.gov/pmc/articles/PMC9939079, describes a Journal of Medical Science (Cureus) call for case reports written with the assistance of the ChatGPT service. The report presents two cases: one on homocystinuria-associated osteoporosis, and the other on late-onset Pompe disease (LOPD), a rare metabolic disorder. The report then describes a corresponding test using the ChatGPT service to write about the pathogenesis of these conditions. The report documents the positive, negative, and "rather troubling aspects" of ChatGPT model's performance. The report notes that "[a] thorough review [i.e., by the human researchers] of the literature on bone metabolism and homocysteine, showed that "the first two facts provided by ChatGPT are correct regarding osteoblast and osteoclast imbalance and the progression of osteoporosis." However, when the researchers "asked ChatGPT to explain these findings further and provide references to fact-check," . . . "ChatGPT provided five reference dating to the early 2000s. None of the provided paper titles existed, and all provided PubMed IDs (PMIDs) were of different unrelated papers."

The same research then tested a ChatGPT model in a different area in which the chat bot was tasked with writing a short essay on liver involvement in LOPD. Of note, liver involvement is known to happen rarely in the infantile, more severe form but not the LOPD. The ChatGPT model, "with apparent confidence, provided an essay on liver involvement which, in reality, has not been reported yet." Researcher fact-checking showed that "ChatGPT provided confident responses that seemed faithful [but were] non-sensical when viewed in light of the common knowledge in these areas."

The phenomenon encountered by the researched is known as "artificial hallucination," or simply hallucination. In fact, Open AI defines artificial hallucination, which may occur with ChatGPT models, "as a chatbot, generating seemingly realistic sensory experiences that do not correspond to any real-world input. This can include visual, auditory, or other types of hallucinations. Open AI asserts that "[artificial hallucination is not common in chatbots, as they are typically designed to respond based on pre-programmed rules and data sets rather than generating new information. However, there have been instances where advanced AI systems, such as generative models [which is what the ChatGPT model is], have been found to produce hallucinations, particularly when trained on large amounts of unsupervised data."

Open AI went on to suggest that "[t]o overcome and mitigate artificial hallucination in chatbots, it is important to ensure that the system is properly trained and evaluated using a diverse and representative data set. Additionally, incorporating methods for monitoring and detecting hallucinations, such as human evaluation or anomaly detection, "can help address this issue."

Another concern related to AI systems involves integration of Large Language Models (LLM) (e.g., ChatGPT models) in technical or academic writing. While ChatGPT, for example, is being touted as streamlining the writing process, that same integration may be a threat to the integrity of authorship. In addition, while an LLM such as the ChatGPT model may "write" ostensibly credible scientific papers, because of the hallucination problem, such papers may be a mix of actual facts and fabrications. This concern about the integrity and accuracy of LLM-authored papers has led some in the AI industry to suggest use of "AI output detectors" in the editorial process and to clearly disclose when these AI technologies are used. Other solutions include rigorous review of LLM-authored papers. Thus, to address the potential for creating "false experts" in, for example, the medical field with the corresponding potential of causing harm due to a lack of real experience and the generation of LLM-authored expert opinions, current solutions to credibility, accuracy, and integrity problems rely, are, generally, non-technical, and are "backward-looking" in the sense that the solutions are applied to an LLM-authored paper rather than incorporating technical solutions that may be deployed before and during the actual production of an LLM-generated product.

To overcome the above-noted technical limitations with current AI systems, including ChatGPT models, and other Large Language Models (LLM) and "pretrained" chat bots, disclosed herein are AI systems (also referred to herein as Cure (Comprehensive Understanding and Research) AI systems and Cure AI models) and corresponding Cure AI methods that, rather than "retrospective" verification, incorporate as technical solutions, a set of "checks and balances" in which, as examples, specific instructions are provided in a prompt to use exclusively material from a context and artificial to not make up any information not found in the context. These technical solutions improve AI system responsiveness and reliability, as disclosed herein. Thus, the herein disclosed technical solutions of Cure AI provide a significant technical improvement over current AI systems. The Cure AI systems and methods may be used in any LLM, including, for example, a ChatGPT-3.5-Turbo model. In an example, a Cure AI model is an enhanced GPT-3.5-Turbo model, wherein the "enhancements" refer to the technological solutions disclosed herein.

These technical solutions include, but are not limited to, 1) more robust, context-based prompts, 2) query refinement, 3) limiting search to a prescribed data source, and 4) a context-specific vector database with reference back to an original database to be searched.

For ease of description and clarity of concepts, the herein disclosed technical solutions of Cure AI are disclosed as pertaining to a medical information system, and specifically to use of PubMed (i.e., the PubMed database) in answering medical and biotechnical queries. Those queries may be research-related or real-time diagnosis-related, for example. Thus, the human users of the herein disclosed AI systems and methods may be medical professionals (e.g., medical doctors) or medical researchers. However, the herein disclosed technical solutions may be applied to many other technical and scientific fields and applications. The technical solutions further are disclosed as implemented on current AI models, and specifically GPT-3.5 Turbo. However, a Person of Ordinary Skill in the Art (POSITA) will recognize that the herein disclosed technical solutions may be adapted to improve the operation of other chat bots and other AI systems.

The herein disclosed technical solutions are based on generation and use of a context-specific vector database. While other database structures may be employed, vector databases provide specific advantages when used with the herein disclosed technical solutions. An example vector database is named Pinecone. Thus, a preliminary aspect of the herein disclosed technical solutions is generation of a vector database, with all its attendant features.

Accordingly, the herein disclosed technical solutions include structures, systems, and methods to implement a context-specific vector database with indexes to a PubMed database. The herein disclosed technical solutions further include structures, systems, and methods to receive queries on the vector database, refine the queries, generate prompts, refine the prompts, apply the refined queries to the vector database, and provide a context-specific query response, including a comprehensive answer to the refined query, with citations to the PubMed database.

In addition to a query-response operation, the herein disclosed structures, systems, and methods may be used to generate documents based on the content of the vector database; i.e., to generate, for example, a technical or scientific report. Furthermore, the herein disclosed structures and systems are configured, and the methods are executable, to provide authoritative citations to support the thus-generated technical and scientific reports.

The herein disclosed example systems and structures include a processor, a non-transitory, computer-readable storage medium, a machine interface to an external data source, a vector database, and a (human) user interface. The non-transitory, computer-readable storage medium includes machine instructions executable by the processor to implement the herein disclosed methods. The machine instructions, for ease of description, may be thought of as a series of modules. In a specific example, the data source is a PubMed database, and the machine interface allows the processor to "scrape" the PubMed database to retrieve relevant articles and corresponding metadata, a data processing module to parse the retrieved data, and to store the parsed data in, for example, a .csv format. An embedder module that reads the .csv data into a data frame, processes the data frame (optionally, in chunks), generates vector embeddings (i.e., vectors), and adds the vector embeddings to the data frame to generate a final data frame. In an aspect, the vector database stores the vector representations of PubMed articles along with corresponding PubMed IDs. The PubMed IDs allows CURE AI to pull data from the PubMed database.

The vector embeddings are a type of data representation that carries within it semantic information that may be used in subsequent queries and query responses. In an aspect, an AI model, such as a Large Language Model (LLM) (e.g., GPT-3.5-Turbo) generates the vector embeddings. Such vector embeddings may have a large number of attributes or features, making their representation challenging to manage.

These features represent different dimensions of the data that are essential for understanding patterns, relationships, and underlying structures. The vector embeddings pay be presented as a large list of floating-point numbers, each number corresponding to a "dimension." In an aspect, the Cure AI model generates 1536 dimensions for each data unit being processed to form a vector embedding. The herein disclosed vector database is capable of handling this type of data, offering optimized storage for, and querying capabilities of, the vector embeddings.

Turning to an example query-response operation enabled by the herein disclosed AI structures (e.g., the Cure AI models) and systems, through the user interface, the processor may receive a query from a human user, provide one or more prompts, refine the query, using a script, generate a comprehensive answer, and present the refined query, the prompt(s), and a comprehensive answer, all as part of a response to the query. Furthermore, the processor may correct the query prior to refining. Generating a prompt may include assigning a role or identity to the model, assigning a task to the model, and placing conditions on the task related to how the model is to generate the comprehensive answer. The role or identity provides the chat bot model with a reference from which to address the query, and a purpose for providing the comprehensive answer. The task may provide specific instructions that the model is to follow to generate a desired query response. In the example of answering queries based on the PubMed database, the Cure AI model may be instructed to assume the role of a medical assistant with the purpose of researching a medical issue. The assigned a task may include researching medical articles related to a specific medical condition, a set of symptoms, or treatment plans. In an aspect, the model may include two separate prompts, a user (identity) prompt, and a system (task) prompt. The Cure AI model may be instructed to provide the comprehensive answer using only the content of PubMed documents referenced in the vector database. The model further may be instructed to not make up information in preparing the comprehensive answer.

Example steps to generate the comprehensive answer may include refining the user query and filtering relevant articles from the data source (e.g., the PubMed database) using the vector database. A prompt may include adding additional information such as categorizing the prompt, identifying essential keywords, and identifying the context of the prompt. The prompt then may be used in a bot( ) function, which may start by prioritizing randomized control trials (RCT) data, and similar significant data in the PubMed articles. A script then calls a Filter( ) function, which is imported from the embedding module. This function takes the prompts and a parameter topK to return the top K most relevant article abstracts and their corresponding PMIDs. The vector database provides an efficient similarity search using vector embeddings of the PubMed abstracts stored in the Pinecone database. After the most relevant articles are filtered, the script generates a comprehensive answer using the Cure AI model. The script calls a bot( ) function to construct a message that includes the relevant context (filtered abstracts), the prompts, and any additional instructions. The script then sends the message to the Cure AI model using a ChatCompletion.create( ) function. The comprehensive answer generated by the Cure AI model then is combined with the PMIDs of the filtered articles and returned by the bot( ) function. The comprehensive answer as well as the refined query and the prompts then may be presented to the human user through the user interface. Thus, the complete query-response operation involves refining the user query, applying user and system prompts, filtering relevant articles using vector embeddings, and generating comprehensive answers using Cure AI model along with the relevant context and refined queries.

However, unlike current implementations, the herein disclosed AI structures (e.g., the Cure AI model) and systems provide a significantly reduced occurrence of artificial hallucinations. Such reduction is achieved, at least in part, by implementing the herein disclosed technological solutions. The difference in performance between the Cure AI model and a non-modified GPT-3.5-Turbo model can be seen in the Cure AI response and the ChatGPT response shown, respectively, in FIGS. 13A and 13B. FIGS. 13A and 13B are described herein in more detail.

FIG. 1 illustrates an example computer network configured to implement the herein disclosed artificial intelligence systems and corresponding methods. As shown in FIG. 1, example computer network 100 includes non-transitory, computer-readable storage medium 110 having encoded thereon a program 200 of machine instructions that are executed to provide an improved query-response operation with significantly reduced occurrence of artificial hallucination. The computer-readable storage medium 110 is coupled to one or more processors 120 that execute the program 200 using well-known techniques. Coupled to the processors 120 is database 130, which may include data storage and a library of routines called during execution of the machine instructions. Also coupled to the processors 120 one or more external data sources 150, including, for example, a PubMed database. Still further, coupled to the processors 120 are one or more vector databases 140.

Figure 2:
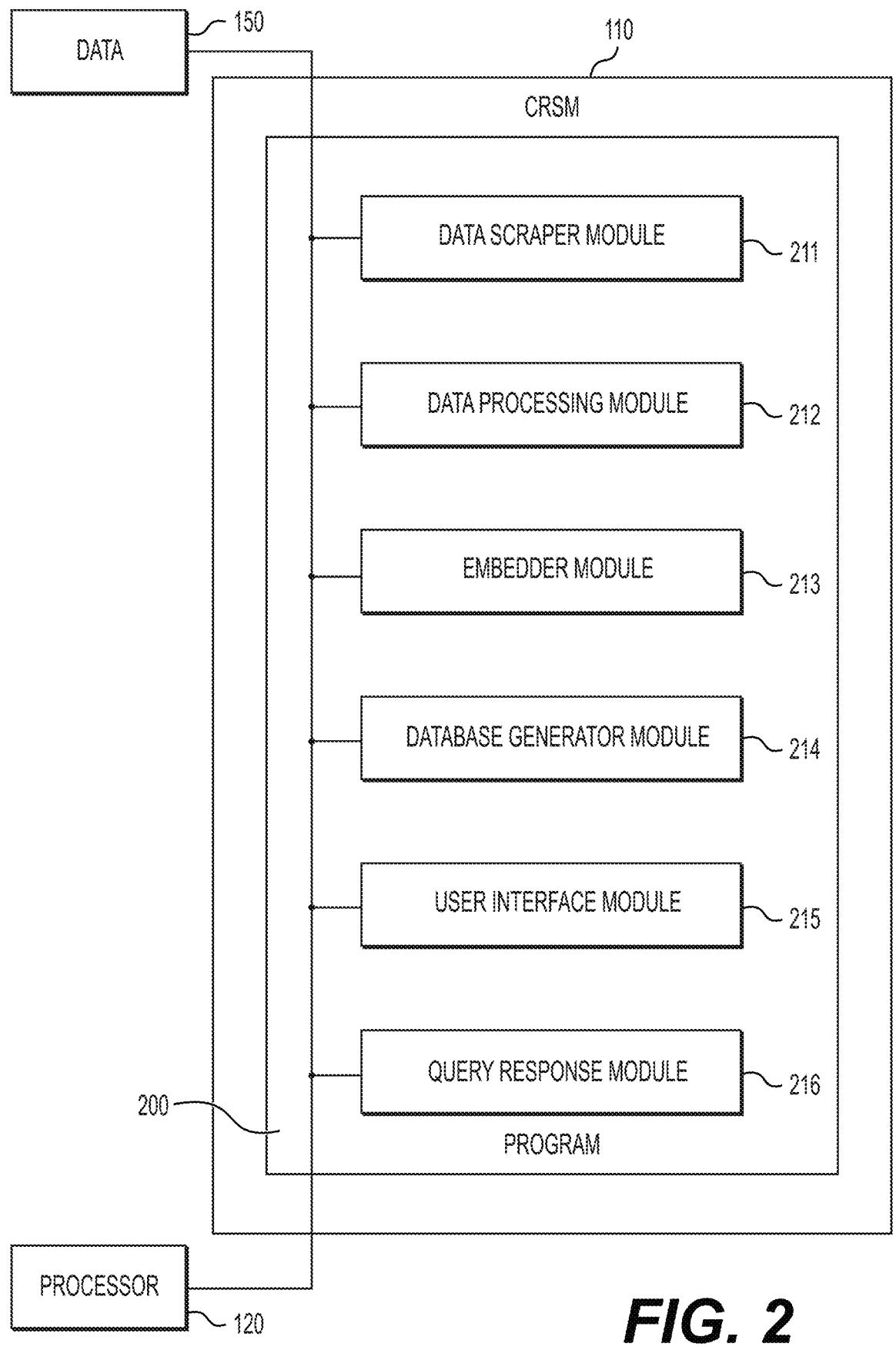
FIG. 2 illustrates an example computer program executable to implement the herein disclosed artificial intelligence systems.

FIG. 2 illustrates an example computer program executable to implement the herein disclosed artificial intelligence systems. In FIG. 2, computer program 200, which may be stored on non-transient computer-readable storage medium 110, includes data acquisition module 211, data processing module 212, embeddings module 213, database generator module 214, user interface module 215, and query response module 216. One or more of the processors 120 may access the program 200, upload all or portions of the program 200 to memory, and execute machine instructions or scripts associated with the uploaded program 200. In an example, the modules are written using Python scripts, which then are invoked to execute the herein disclosed methods. The Python scripts work together to retrieve, process, and analyze data retrieved or accessed from data sources 150. In one example, the data sources 150 provide PubMed articles related to biomedical research. The processors 120 may use various libraries such as os, json, pathlib, time, requests, lxml, csv, pandas, pinecone, dotenv, openai, embedding, and more. In an aspect, one or more of the above-disclosed modules may be included in the Cure AI model. That is, the Cure AI model encompasses, but is not limited to, the program 200. Furthermore, some modules of program 200 may exist outside the Cure AI model. Thus, a processor 120 executes the Cure AI model, and such execution is shown in the non-inclusive flowcharts of FIGS. 3A, 3B, and 5-12.

Figure 3A:
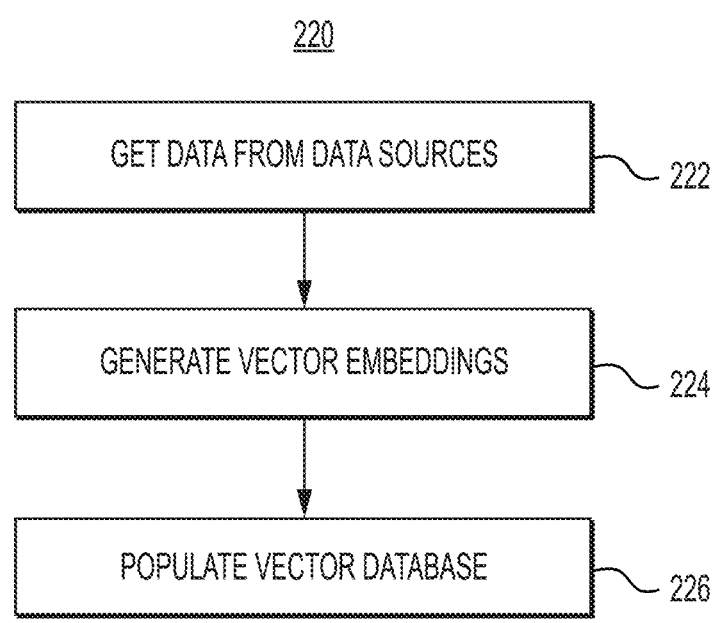
FIGS. 3A and 3B illustrate an example operational schematic of a herein disclosed example artificial intelligence system.
Figure 4A:
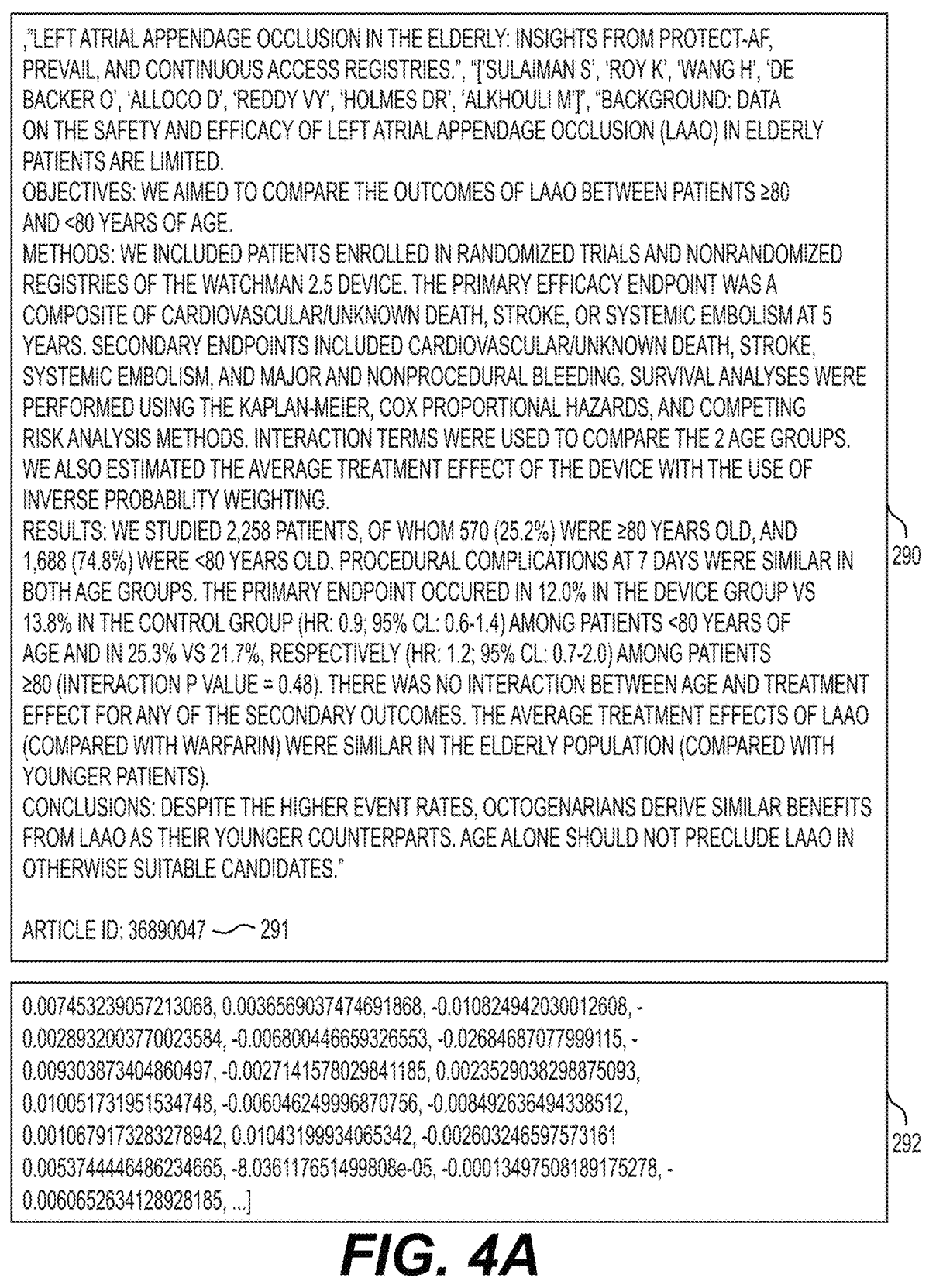

FIG. 3A illustrates an example operational schematic of a herein disclosed example artificial intelligence system. The example operational schematic produces and uses a number of objects, examples of which are shown in FIGS. 4A-4C. In FIG. 3A, operation 220 relates to construction or generation of a vector database, such as database 140, that may be used in operation 260 to answer user-provided queries. Operation 260 relates to a user query and corresponding query response. Operation 220 includes a method 222 of scraping an existing database, such as a PubMed database of biotechnology articles (data source 150) to retrieve abstracts, metadata, and PubMed IDs (PMIDs). Next, method 224 is invoked to generate embeddings based on the results of method 222. The embeddings may be generated by execution of embedder module 213 (see FIG. 2). Then, method 226 is invoked to populate vector database 140 with the embeddings (vectors) and with each embedding, a corresponding PubMed ID (identification).

Figure 3B:
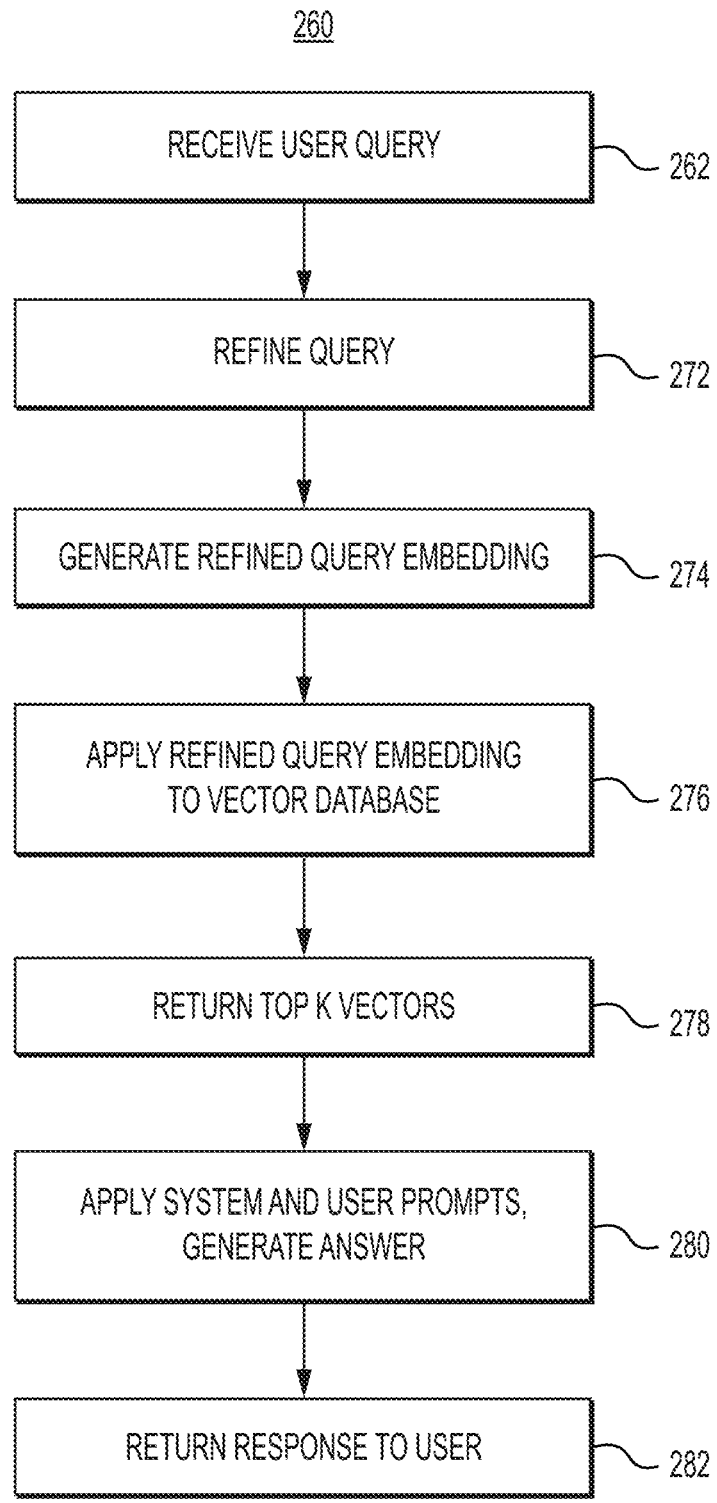

With the vector database 140 available, the herein disclosed artificial intelligence system is able to receive human user-provided queries and to generate corresponding query responses. More specifically, as shown in FIG. 3B, operation 260 begins with a method 262 of receiving through human user interface 160, a query. Next, a method 272 refines the received query, method 274 generates a vector embedding of the refined query, and method 276 applies the refined query to the vector database 140. Then, method 278 returns the top K vector embeddings using a nearest neighbor routine, such as cosine similarity. Next, method 280 is invoked to generate a comprehensive answer by applying system and user prompts and the refined query to PubMed articles identified by the returned top K vector embeddings, and method 282 is invoked to provide a response, which includes the comprehensive answer, to the human user.

FIGS. 4A-4C illustrate example objects used by the herein disclosed example artificial intelligence systems invoking the operational schematics of FIGS. 3A and 3B. FIG. 4A illustrates an example PubMed article 290 and corresponding embedding 292. As can be seen in FIG. 4A, PubMed article 290 includes an Article ID 291. The embedding 292 is shown as a vector having multiple dimensions, each dimension represented by a floating-point number (the closed bracket at the end of the string of floating-point numbers is for ease of illustration and should be understood to mean the vector dimensions include one or more floating-point numbers that are illustrated). Thus, the embedding 292 may include 1536 dimensions (floating point numbers), only a few of which are illustrated. Thus, embedding 292 is a vector representation of PubMed article 290.

FIG. 4B illustrates a user query 293 and a corresponding refined query 294. The refined query 294 includes Query Refiner (system) 295 and Query Refiner (user) 296. Query Refiner (user) 296 includes the user's original user {question} 293A. In an aspect, the Query Refiners 295 and 296 are static with the exception of {question} 293A.

FIG. 4C illustrates prompts that are used to direct the large language model to assess the content of PubMed articles identified from an initial user query (see, e.g., query 293, FIG. 4B). In FIG. 4C, Cure AI identity prompt (system) 297 provides an appropriate identity for the large language model (e.g., the Cure AI model). The (PubMed ID 1234567) should be understood to be a placeholder that is to be replaced with an actual PubMed ID based on the embeddings returned from the vector database 140. The prompt 297 may be static (i.e., prompt 297 may be used for all, or many user queries). Cure prompt (user) 298 provides explicit instructions, conditions, and limitations for the large language model. The prompt 298 repeats the refined query 294A {query}, and includes the context 298A {context}. The example prompt 297 is shown to include instructions to favor "randomized controlled trials (RCT) and meta-analyses" if appropriate. Other technical terms or features may be cited in the instructions of Cure prompt (user) 298.

Figure 5:
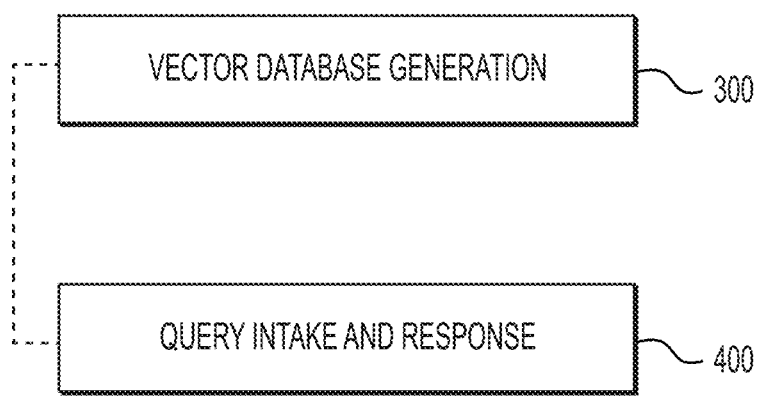
FIG. 5 illustrates example routines executed by the example computer network of FIG. 1 using the example computer program of FIG. 2.

FIG. 5 illustrates example routines executed by the example computer network of FIG. 1 using the example computer program 200 of FIG. 2. As shown in FIG. 5, the computer program 200 includes vector database generator routine 300, which executes to enable a vector database construction operation, and query intake and response generator routine 400, which executes to enable a query intake, query refinement, and comprehensive response (answer) generation and display.

Figure 6:
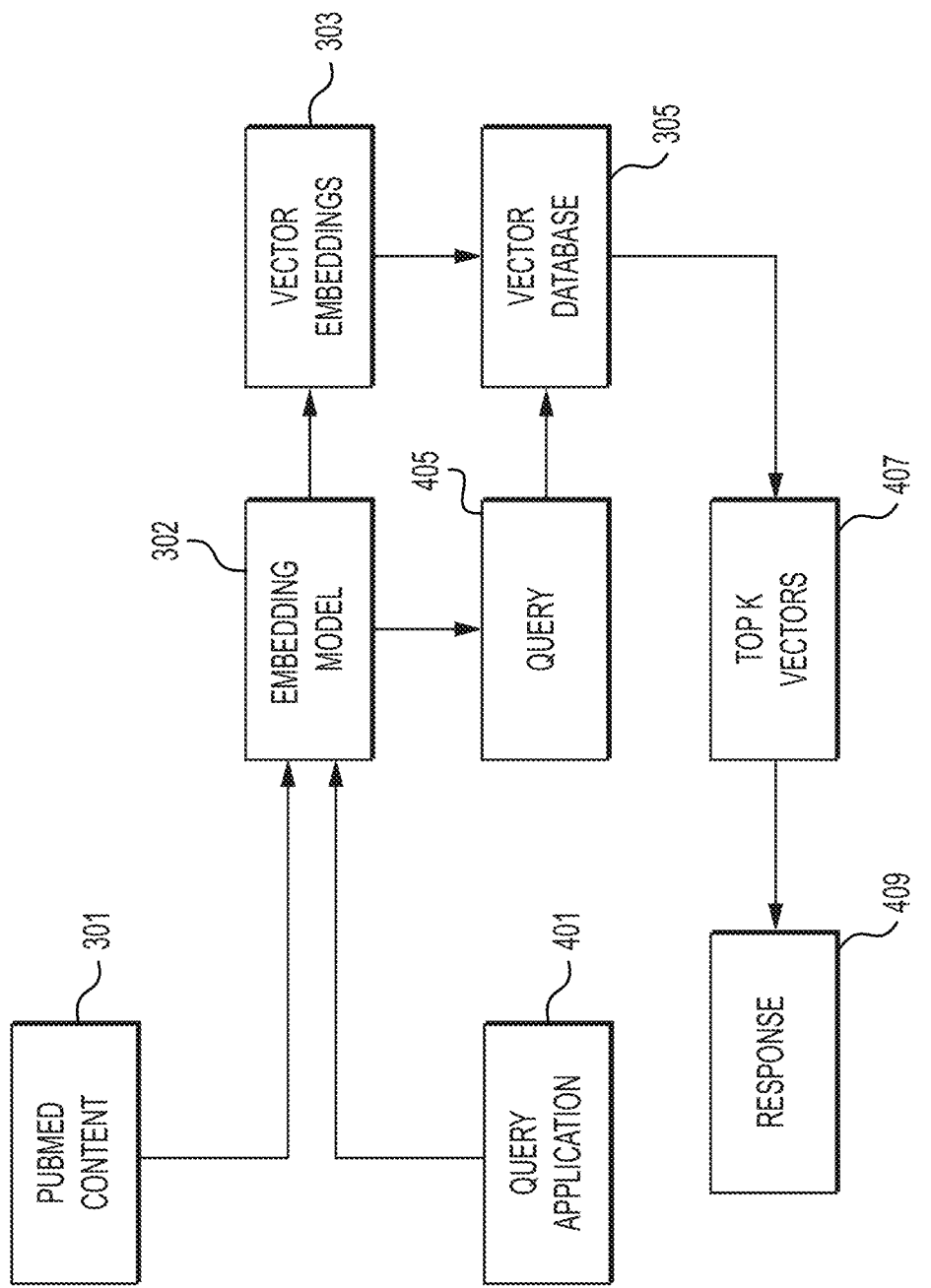
FIG. 6 illustrates certain aspects of the example routines of FIG. 5.

FIG. 6 illustrates an example overview of the routines of FIG. 5. In FIG. 6, PubMed content or data (i.e., articles) are acquired (block 301) by one or more of the processors 120. The PubMed data then are provided (block 302) to an embedding model, which generates (block 303) vector embeddings for the PubMed data. The vector embeddings are stored (block 305) in vector database 140, and may include a reference to the original PubMed content (for example, by use of a PMID). Subsequently, a query application generates (block 401) a specific query, and the same embedding model generates (block 302) an embedding for the query; the query embedding then is used to query (block 405) the vector database 140, and through a similarity function, to identify similar embeddings. The similarity function may be a nearest neighbor function. Possible nearest neighbor functions include cosine similarity, Euclidean distance, and dot product. Cosine similarity measures the cosine of the angle between two vectors in a vector space. The cosine ranges from −1 to 1, where 1 represents identical vectors, 0 represents orthogonal vectors, and −1 represents vectors that are diametrically opposed. In block 407, the top K returned vectors are used together with prompts 297/298 (see FIG. 4C) to generate (block 409) a query response, including a comprehensive answer.

Returning to FIG. 5, a first script of the vector database generation routine 300 executes to scrape PubMed articles, saves the scraped data as a CSV file, and generates and uploads text embeddings to vector database 140 (see FIG. 1). More specifically, the first script imports a PubMedScraper class from the scraper module 211 (see FIG. 2), which executes to scrape article abstracts from the PubMed database. The PubMedScraper class takes a list of PMIDs as an input and uses a Biopython library, specifically the Entrez module, to fetch corresponding PubMed articles. The first script preprocesses the text data using a preprocess_text( ) function (data processor module 212) and a second script converts the abstracts into vector embeddings as outlined in an embedding.py script description (embedder module 213) and saves the embeddings in a .csv file. Finally, the first script uploads embeddings to the vector database 140 for efficient similarity search in later stages of the program 200 execution.

Next, a second script executes to load environment variables, prepare the PubMed data, process the data in chunks, and create embeddings using, for example, OpenAI's text-embedding-ada-002 engine.

A third script enables refining user prompts or queries, further filtering relevant articles using a vector database (e.g., Pinecone), and generating comprehensive answers using the Cure AI model. The third script loads environment variables and retrieves the NCBI API key and the OpenAI API key, which then are used for interacting with the PubMed database and the Cure AI model, respectively.

More specifically, a queryRefiner( ) function refines user queries by incorporating additional information to create a more robust query, using the herein disclosed Cure AI. The refined query is better able to retrieve relevant literature and communicate the user's query more effectively to the Cure AI model.

The refined query then is used in the following steps. A filter( ) function calculates the cosine similarity between the input refined query embedding and each PubMed article's embedding to rank the article's relevance in view of the refined query, returning the top K most relevant articles. For example, a bot( ) function filters relevant articles using a pineconeFilter( ) function, which returns the topK most relevant article abstracts and their corresponding PMIDs based on their embeddings. A vector database such as Pinecone is used for efficient similarity search, based on the vector embeddings stored in the Pinecone database.

Once the most relevant (top K) articles are filtered, the bot( ) function generates a comprehensive answer using the Cure AI model. The function constructs a message (e.g., one or more prompts-see example of FIG. 4C) that includes the relevant context (filtered abstracts), the refined question, and any additional instructions. The message is sent to the Cure AI model using a ChatCompletion.create( ) method.

As shown in the example of FIG. 4C, the Cure AI model may be given a system message that instructs the model to act as a medical assistant chatGPT AI named CURE (Comprehensive Understanding and Research Engine AI). The Cure AI model then is tasked with providing a comprehensive answer based on the relevant context supplied, using appropriate medical terminology and conveying information in a clear and concise manner. The comprehensive answer generated by the Cure AI model is then combined with the PMIDs of the filtered articles and returned by the bot( ) function. The complete process enables human users to receive comprehensive answers based on the most relevant articles, facilitating a better understanding of, for example, the latest research in cardiology and cardiovascular diseases.

Figure 7:
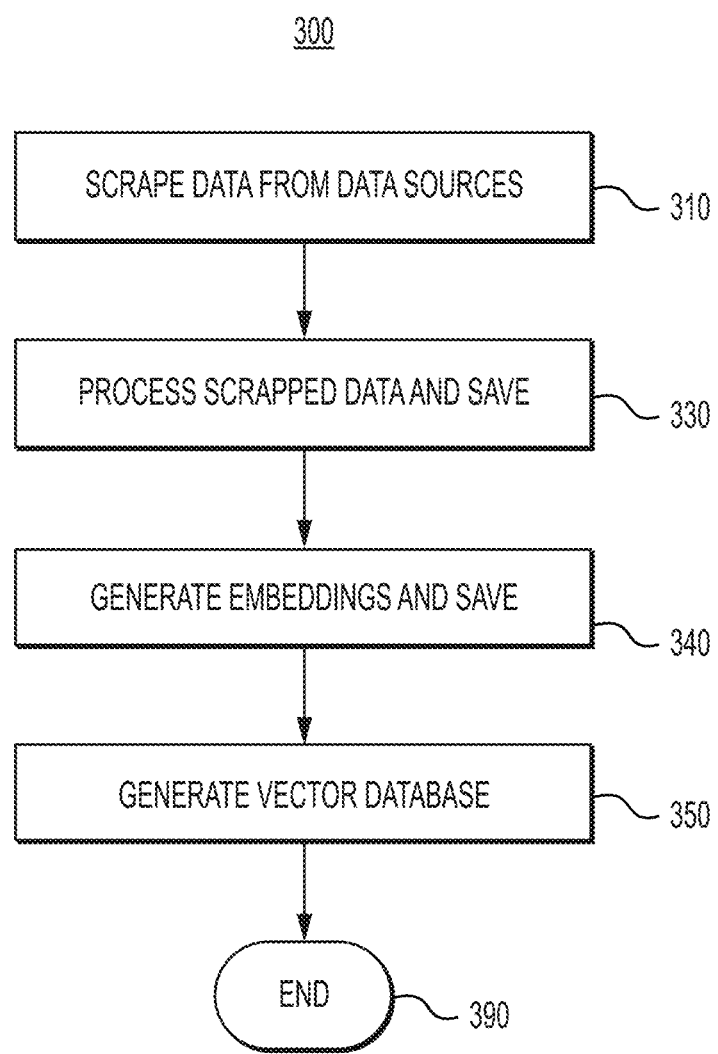
FIG. 7 illustrates in more detail the example routines of FIG. 5.

FIG. 7 illustrates certain operations of the example routines of FIG. 5 in more detail. In particular, FIG. 7 illustrates the vector database generation routine 300 in more detail. As shown in FIG. 7, routine 300 includes data scrapping operation 310, scraped data processing operation 330, embeddings operation 340, and vector database generation operation 350. Following completion of vector database operation 350, routine 300 ends, 390. Routine 300 may execute to initially populate the vector database 140, and periodically and/or episodically thereafter.

Figure 8:
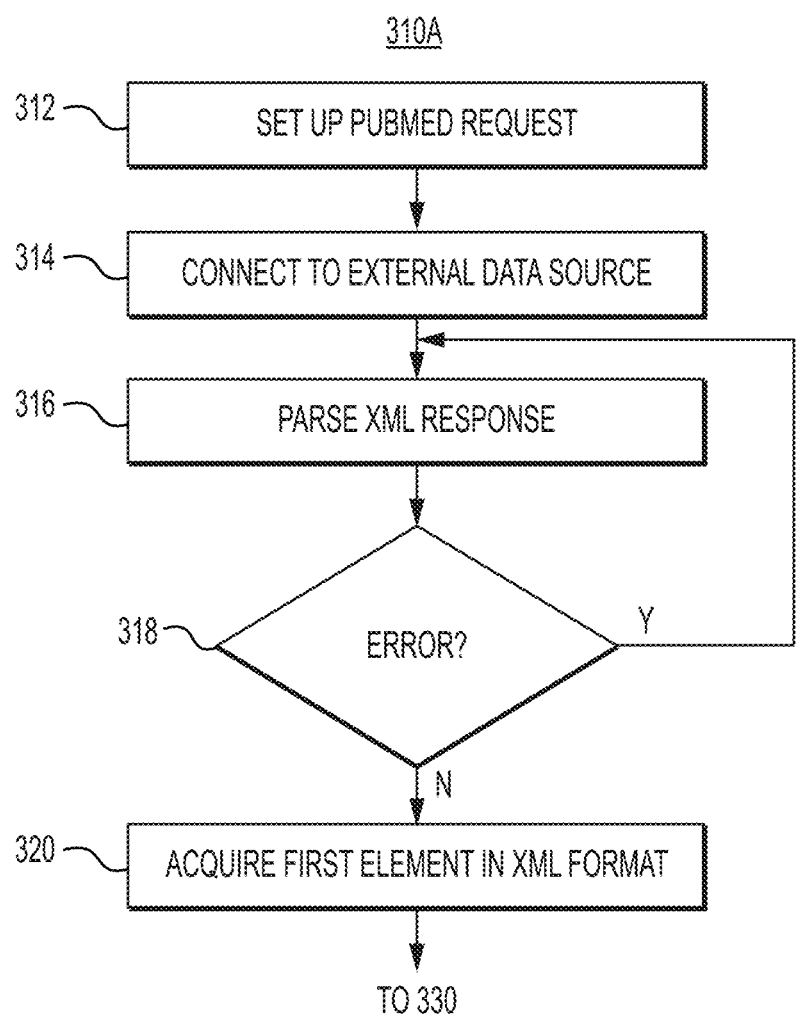
FIG. 8 illustrates in yet more detail the example operations of FIG. 5.

FIG. 8 illustrates in more detail the example operations of FIG. 7. In FIG. 8, operation 310A includes a step (block 312) of setting up a PubMed data access request, a step (block 314) of connecting to an external data source 150 (e.g., the PubMed database); and a step (block 316) of parsing an XML response from the PubMed database. In a next step (block 318), the processor 120 determines whether or not an error occurred during the parsing step of block 316. If an error occurs, the operation 310A returns to block 316, and another parsing step is executed. If in block 318, no error is detected, operation 310 moves to a step (block 320), in which the processor acquires a first data element (e.g., a PubMed article) in an XML format in order to upload relevant information for embedding and subsequent uploading to the vector database. Following block 320, routine 300 moves to operation 330A.

Figure 9:
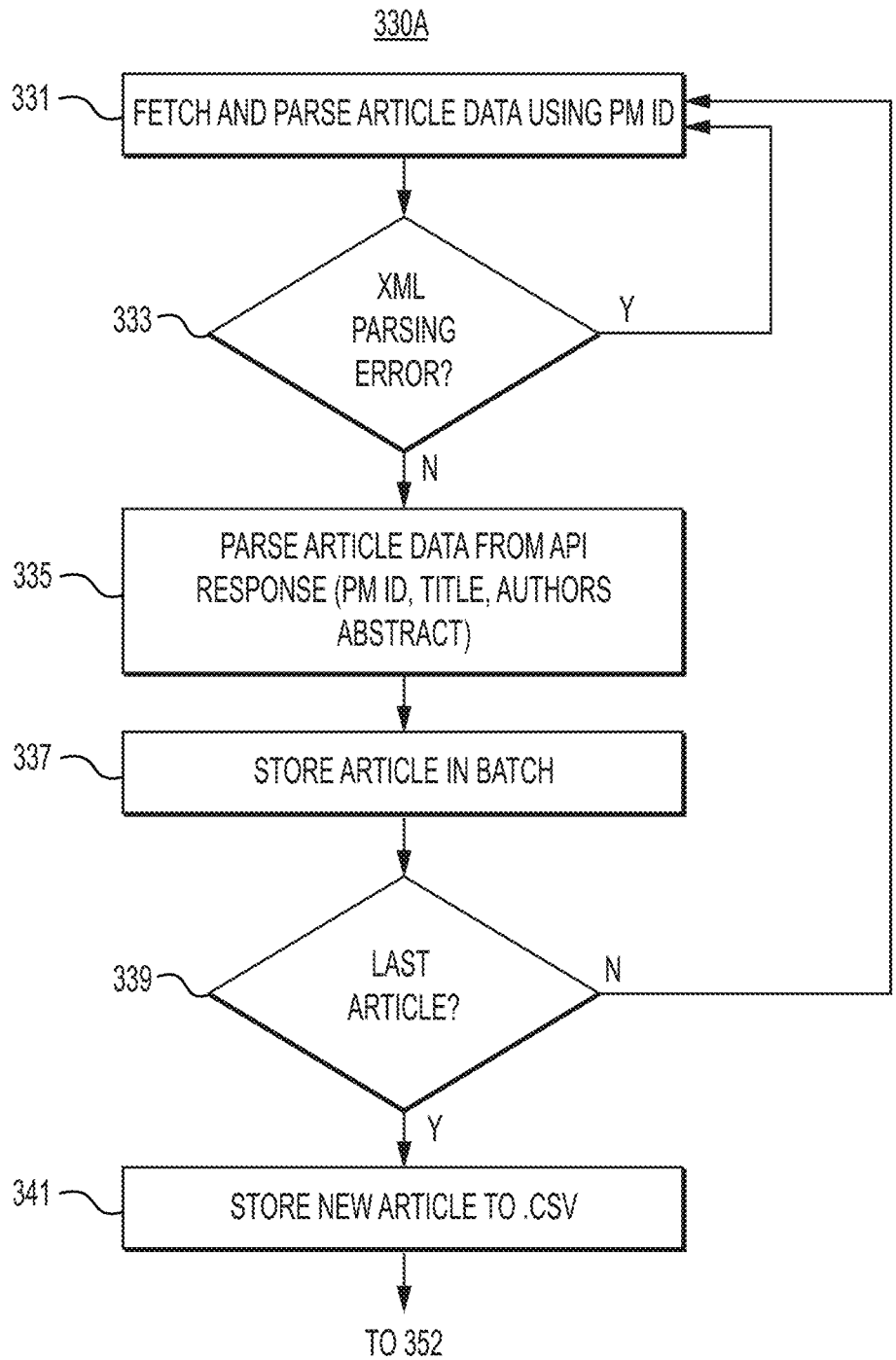
FIG. 9 illustrates in still more detail the example operations of FIG. 5.

FIG. 9 illustrates in yet more detail the example operations of FIG. 7. In FIG. 9, operation 330a begins in block 331, wherein the processor 120, using the PMID, fetches and parses PubMed article data for a first (potentially relevant) article. In an aspect, and prior to the operations of FIG. 9, the herein disclosed CURE AI system may be provided with search terms, based on the context of PubMed articles such that, based on the user-provided query and corresponding refined query, as disclosed herein, the Cure AI operation will be directed to relevant articles within the scope of the refined query. Following block 331, the processor 120 determines, in block 333, if the parsing operation of block 331 results in an XML parsing error. For example, when identifying PubMed articles to be ingested, some articles may not be formatted in a manner that allows the desired ingestion, and thus cannot be parsed. If a parsing error is detected in block 333, operation 330a returns to block 331 and a next article is chosen. If no parsing error is detected in block 333, operation 330a moves to block 335 and the processor 120 parses article data from the API response (PMID, Title, Authors, Abstract). Next, in block 337, the processor 120 stores the article in a batch data file (database 130, FIG. 1). In block 339, the processor 120 determines if the article is the last article to be processed. If the article is not the last article, operation 330A returns to block 331, and a next article is chosen for processing. If the article is the last article, operation 330a moves to block 341 and the processor stores the new article data as a .csv file (in database 125). Following block 341, routine 300 moves to block 350A.

Figure 10:
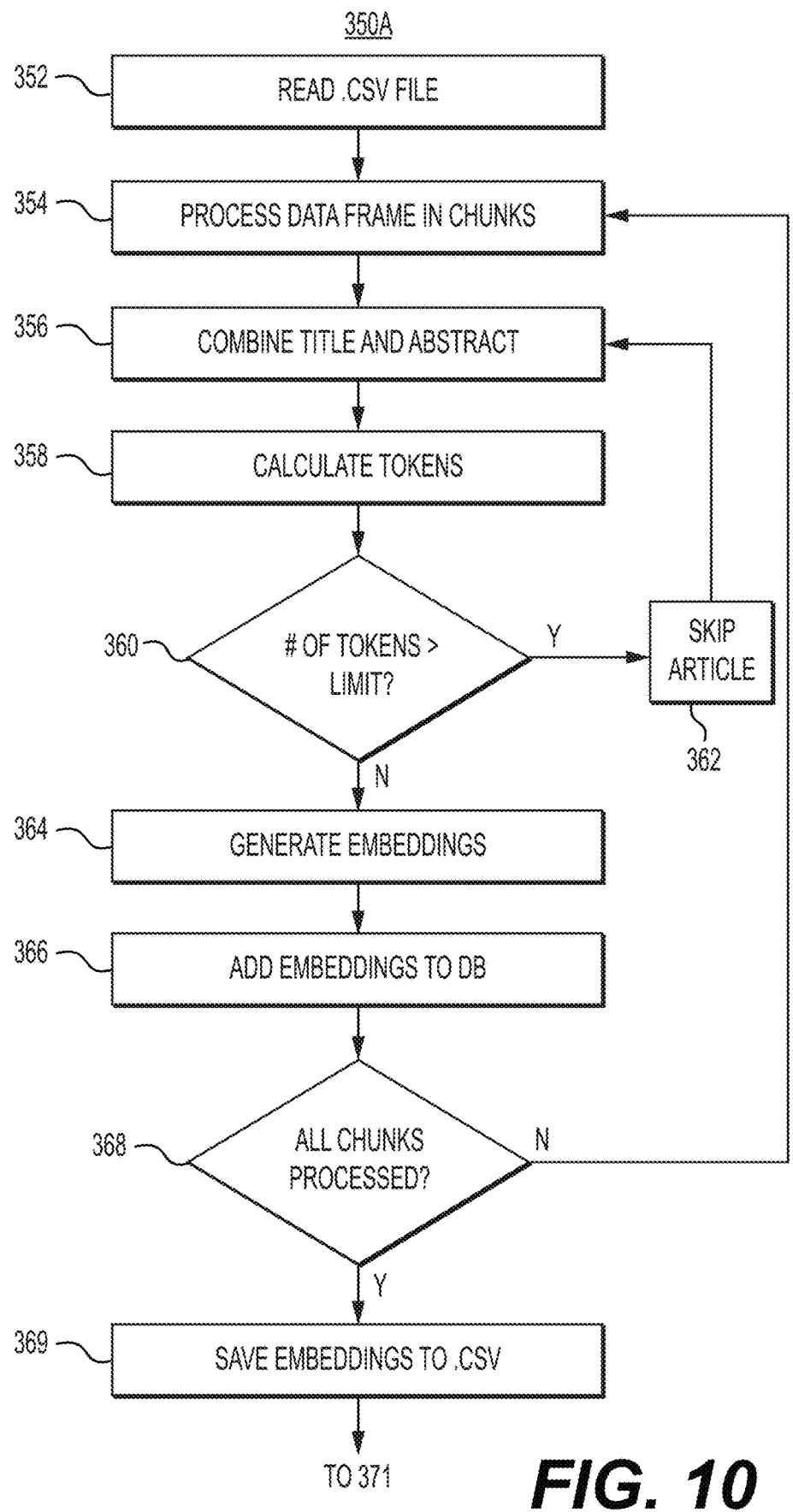
FIG. 10 illustrates in further detail the example operations of FIG. 5.

FIG. 10 illustrates in still more detail the example operations of FIG. 7. In FIG. 10, operation 350a begins in block 352 with the processor 120 reading the .csv file. In block 354, the processor 120 processes the data frames in chunks (processing the data frames in chunks may be more efficient that processing an entire data frame; additionally, the PubMed database (for example) may limit the amount of data that may be processed in one operation). In block 356, the processor 120 combines title and abstract. In block 358, the processor 120 determines the number of tokens needed to generate embeddings from the PubMed database (with processing confined to discrete chunks of data) (note that some embedding routines are limited on the basis of a number of tokens to be processed, with the number of tokens bearing a relationship to the number of words or other data objects to be processed). In block 360, the processor 120 determines if the number of tokens is greater than a limit. If yes, operation 350a moves to block 362 and skips the article. Operation 350a then returns to block 356. If no, operation 350a moves to block 364 and the processor 120 generates embeddings. Next, in block 366, the processor 120 adds the embeddings to a data file. In block 368, the processor 120 determines if all chunks have been processed. If no, operation 350a returns to block 354. If yes, operation 350a moves to block 369 and saves the embeddings to a .csv file (in database 125). Following block 369, routine 300 moves to operation 370A, block 371.

Figure 11:
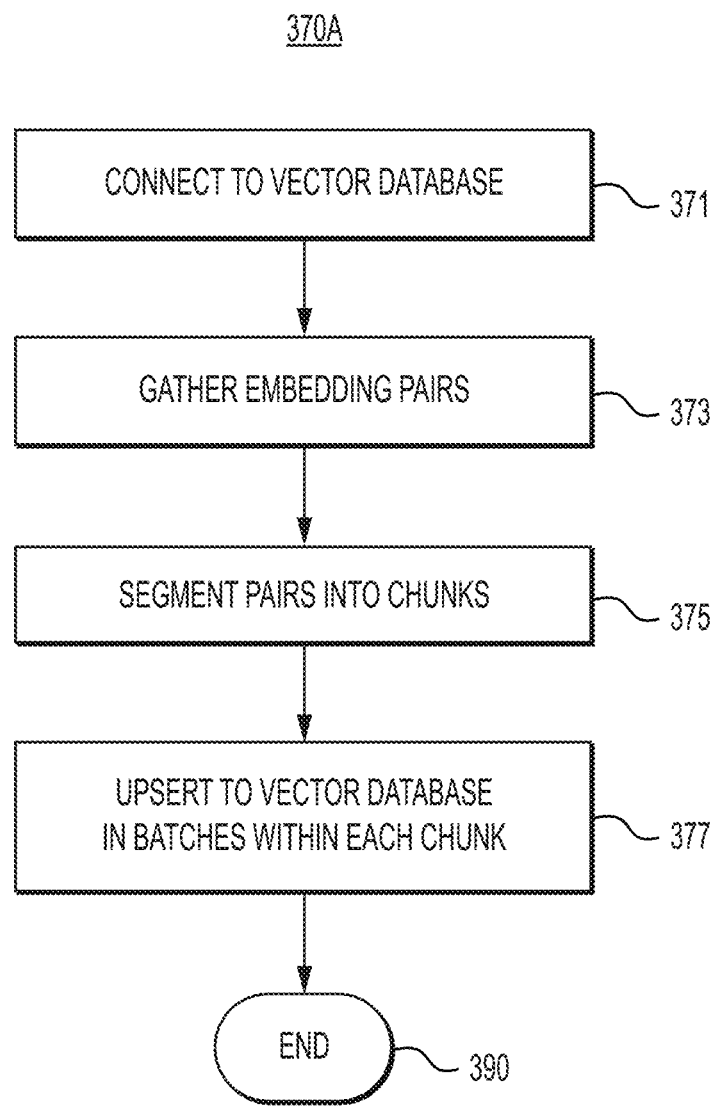
FIG. 11 illustrates other example operations of FIG. 5 in more detail.

FIG. 11 illustrates in further detail the example operations of FIG. 7. In FIG. 11, operation 370a begins in block 371, the processor 120 executes program 200 to connect to vector database 140. In block 373, the processor 120 executes the program 200 to gather embedded pairs (a pair referring to a vector embedding and its corresponding PubMed ID (PMID)), and in block 375 segments the pairs into chunks. In block 377, processor 120 executes to upsert the chunks to vector database 140. When all chunks are upserted, operation 370a moves to block 390, and ends.

Figure 12:
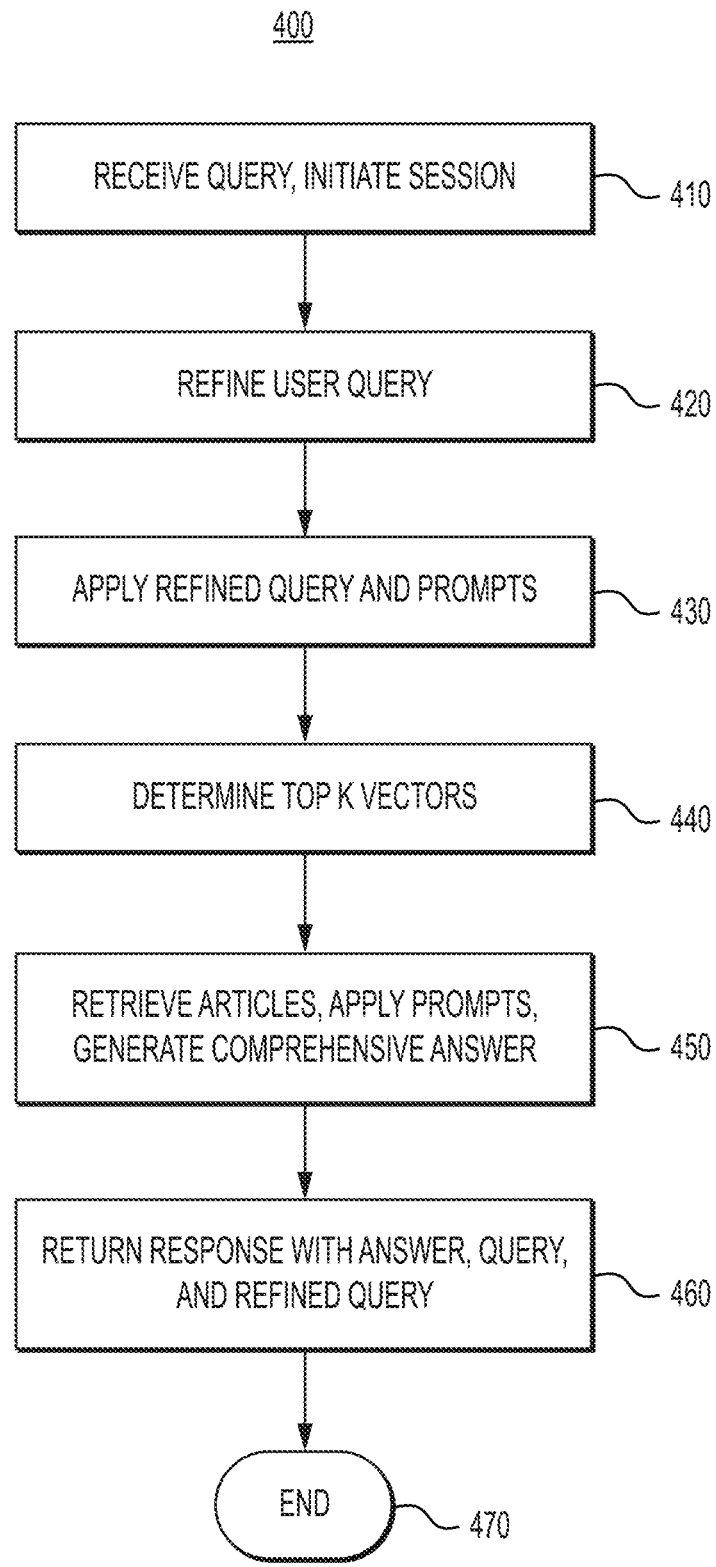
FIG. 12 illustrates an example query-response operation of the herein disclosed example artificial intelligence systems.

FIG. 12 illustrates example routine 400 of FIG. 5 in more detail. In FIG. 12, routine 400, generating a response, including a comprehensive answer, to a user's query (question), begins in block 410 with processor 120 receiving a query, and initiating a corresponding query-response session. In block 420, the processor 120 refines the received user query by invoking a Refiner( ) function. The Refiner( ) function refines user queries by incorporating additional information to create a more robust query, and using the Cure Ai model to generate a refined query. The refined query is better able to retrieve relevant literature (e.g., PubMed abstracts and their embeddings) and communicate the user's query more effectively to a large language model. In block 430, the processor 120 applies the refined query to the vector database 140. In block 440, the processor retrieves the top K most relevant abstracts. In block 450, the processor uses the top K abstracts to generate a comprehensive answer. The technological solutions in the use of the top K abstracts and the system and user prompts (which include the context and the refined query) guarantee, as shown below with reference to Table 1 and FIGS. 13A and 13B, the herein disclosed Cure AI model, system, and methods, produce comprehensive answers with no hallucinations and 100% verifiable references. In block 460, the processor 120 returns the comprehensive answer to the user by way of user interface 160. The routine 400 then ends, block 470.

FIGS. 13A and 13B illustrate a portion of a comparison study that assessed the fidelity and efficacy of the herein disclosed Cure AI model, system and methods as compared to a current system. Specifically, the study, in 25 separate trials, compared query responses as generated by the improved AI systems (that is, Cure AI) as disclosed herein to query responses generated by current implementations of Open.AI ChatGPT. As disclosed herein, Cure AI builds on the ChatGPT models and provides substantial technological improvements to the ChatGPT model. Table 1 below provides a summary of all 25 of the separate trials that were run between Cure AI and ChatGPT.

TABLE 1

Comparison of Cure AI and ChatGPT-3.5-Turbo

| | CURE AI | | | | | OPEN AI GPT-3.5-TURBO | | | |
|---|---|---|---|---|---|---|---|---|---|
| TRIAL | % Real | % Rel | Ans Y/N | % Ver | TRIAL | % Real | % Rel | Ans Y/N | % Ver |
| 1 | 100 | 100 | Yes | 100 | 1 | 66 | 66 | Yes | 0 |
| 2 | 100 | 100 | Yes | 100 | 2 | 100 | 100 | Yes | 100 |
| 3 | 100 | 100 | Yes | 100 | 3 | 33 | 100 | Yes | 0 |
| ... | | | | | ... | | | | |
| 24 | 100 | 100 | Yes | 100 | 24 | 100 | 100 | Yes | 0 |
| 25 | 100 | 100 | Yes | 100 | 25 | 0 | 0 | Yes | 0 |
| Ave | 100% | 94% | 84% | 100% | Ave | 73.1% | 71.8% | 96% | 32% |

The above table shows an excerpt of 25 trials comparing the basic Open.AI GPT-3.5-Turbo model with the Cure AI model. The table also present the average values achieved by the two chat bots over the 25 trials. FIG. 13A shows, 501A, for Trial 1, the query (question) 502 submitted, the response 510 of the Cure AI model, and the Cure AI references 515 used to generate the response 510. FIG. 13B shows, 501B, for the same question 502 as in FIG. 13A, the response 520 and references 525 produced by the ChatGPT-3.5-Turbo model.

A medical professional conducted the trials. The queries/questions posed to each chat bot are identical for each trial. The models were evaluated based on the number of real references returned (% Real), the number of relevant and useful references (% Rel), whether the query was answered (Ans Y/N) and whether the answer could be verified in the returned references (% Ver). As shown in the above table, the Cure AI model achieved across-the-board 84% percent correct responses (100% real references cited, 94% relevant and useful references cited, query answer rate of 100% and response verification rate of 100%). In other words, the Cure AI model declined to provide an answer to 16% of the queries, but for the 84% queries answered, 100% were verifiable. By contrast, the ChatGPT-3.5-Turbo model achieved a score of 73.1% for identifying real references, a 71.8% score for identifying relevant and useful references, a score of 96% for providing an answer to the question posed, but a score of only 32% for verifying the answer using the returned references. This 64% disparity between verifiable answers and provided answers indicates the GPT-3.5 Turbo model "hallucinated" when generating the majority of its answers. Furthermore, as can be seen in FIGS. 13A and 13B, the Cure AI model produced a significantly improved response compared to that of the ChatGPT-3.5-Turbo model. More fundamentally, the trials show that the Cure AI model guarantees a comprehensive answer that is hallucination-free and that uses only verifiable references. When the Cure AI model is not able to answer a query based on the returned references, the Cure AI model declines to answer the query. By contrast, the Open.AI GPT-3.5-Turbo model, because of its structural defects, produces answers that cannot be trusted; in essence, these untrustworthy answers cannot guarantee no hallucinations and cannot guarantee verifiable references. Accordingly, neither the Open.AI GPT-3.5-Turbo nor similar GPT models are satisfactory when applied to scientific research efforts such as scientific research efforts based on the 35-million+article PubMed database. Thus, the technological solutions enabled by the herein disclosed enhanced GPT bot (Cure AI model) provide a distinct and significant advantage over current chat bots, including Open AI chatGPT-3.5 Turbo model.

The preceding disclosure refers to flowcharts and accompanying descriptions to illustrate the embodiments represented in FIGS. 3A-12. The disclosed devices, components, and systems contemplate using or implementing any suitable technique for performing the steps illustrated. Thus, FIGS. 3A-12 are for illustration purposes only and the described or similar steps may be performed at any appropriate time, including concurrently, individually, or in combination. In addition, steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A computer-implemented method for retrospective verification of a document during document production, comprising:
   a processor receiving an original query on a big data source, the big data source comprising a plurality of structured data objects and unstructured data objects, wherein one or more data objects are represented in a vector database corresponding to the big data source;
   the processor generating a refined query from the original query, comprising:
      applying a system query refiner function and a user query refiner function to the original query, and
      applying a system prompt and a user prompt to the original query;
   generating an embedding of the refined query;
   identifying one or more discrete vectors in the vector database most similar to the embedding;
   applying the refined query and one or more most similar vectors to a large language model;
   applying the large language model to the big data source to generate the document, wherein the refined query comprises a role stated as a persona to be adopted by the large language model, a set of instructions to be followed by the large language model, and a set of conditions and limitations imposed on the large language model, comprising:
   using the one or more most similar vectors as an index to the big data source; and
   generating a verified document using data objects indicated by the index and returning the verified document and an identification for each indicated data object.

2. The method of claim 1, wherein the large language model is a ChatGPT model.

3. The method of claim 1, wherein the processor identifies one or more top K vectors in the vector database, wherein K is a parameter with a value determined by the processor.

4. The method of claim 1, The method of claim 1, wherein the user prompt comprises a search context.

5. The method of claim 1, further comprising instructing the large language model not to make up information.

6. The method of claim 1, wherein identifying the one or more most similar vectors comprises executing a cosine similarity routine.

7. The method of claim 1, wherein the system prompt is static, and provides an identity and a role for the large language model.

8. The method of claim 1, wherein the large language model is a chat bot model.

9. The method of claim 1,
   wherein the system query refiner function comprises a set of system instructions directing the large language model to generate the system prompt,
   wherein the user query refiner comprises a set of user instructions directing the large language model to generate the user prompt.

10. A non-transitory, computer-readable storage medium having encoded thereon machine instructions that when executed by a processor, cause the processor to generate retrospectively verified documents, wherein the processor:
    receives an original query on a big data source, the big data source comprising a plurality of structured data objects and unstructured data objects, wherein one or more data objects are represented in a vector database corresponding to the big data source;
    generates a refined query from the original query, wherein the processor:
       applies a system query refiner function and a user query refiner function to the original query, and
       applies a system prompt and a user prompt to the original query;
    generates an embedding of the refined query;
    identifies one or more discrete vectors in the vector database most similar to the embedding;
    applies the refined query and one or more most similar vectors to a large language model;
    applies the large language model to the big data source to generate the document, wherein the refined query comprises a role stated as a persona to be adopted by the large language model, a set of instructions to be followed by the large language model, and a set of conditions and limitations imposed on the large language model, comprising:
    using the one or more most similar vectors as an index to the big data source; and generates the verified document using data objects indicated by the index and returns the verified document and an identification for each indicated data object.

11. The non-transitory, computer-readable storage medium of claim 10,
    wherein the large language model is a ChatGPT model.

12. The non-transitory, computer-readable storage medium of claim 10, wherein the processor identifies one or more top K vectors in the vector database, wherein K is a parameter with a value determined by the processor.

13. The non-transitory, computer-readable storage medium of claim 10, wherein the user prompt is dynamic, wherein the user prompt comprises a search context, wherein inclusion of the search context requires the large language model to generate the verified document using only data objects identified by the index.

14. The non-transitory, computer-readable storage medium of claim 10, wherein the limitations instruct the large language model not to make up information.

15. The non-transitory, computer-readable storage medium of claim 10, wherein the processor uses a cosine similarity routine to identify the one or more discrete vectors.

16. The non-transitory, computer-readable storage medium of claim 10, wherein the system prompt is static, and provides an identity and a role for the large language model.

17. The non-transitory, computer-readable storage medium of claim 10, wherein the processor generates the vector database by generating embeddings of the one or more data objects in the big data source.

18. The non-transitory, computer-readable storage medium of claim 10, wherein the data objects comprise one of text objects, image objects, and combined text and image objects.

* * * * *